United States Patent
Lim et al.

(10) Patent No.: US 6,630,524 B1
(45) Date of Patent: Oct. 7, 2003

(54) FLAME RETARDANT THERMOPLASTIC RESIN COMPOSITION

(75) Inventors: Jong Cheol Lim, Kwachon-shi (KR); Je Heun Lee, Seoul (KR); Ick Hwan Kwon, Seoul (KR)

(73) Assignee: Cheil Industries, Inc., Kyoungki-do (KR)

( * ) Notice: Subject to any disclaimer, the term of this patent is extended or adjusted under 35 U.S.C. 154(b) by 290 days.

(21) Appl. No.: 09/613,861

(22) Filed: Jul. 10, 2000

(30) Foreign Application Priority Data

Jul. 12, 1999 (KR) ......................... 1999-28081
Oct. 23, 1999 (KR) ......................... 1999-46176

(51) Int. Cl.$^7$ ................................. C08J 5/34
(52) U.S. Cl. ............... 524/100; 524/127; 524/136; 524/463; 524/502; 524/504; 524/520
(58) Field of Search ................ 524/100, 127, 524/136, 463, 502, 504, 520

(56) References Cited

U.S. PATENT DOCUMENTS 5,672,645 A   9/1997   Eckel et al.
6,174,945 B1 * 1/2001   Kim et al. ............... 524/127

FOREIGN PATENT DOCUMENTS

DE   196 32 675 A1   2/1998
EP   0 700 968 A1    3/1996
EP   0 767 204 A2    4/1997

* cited by examiner

Primary Examiner—David W. Wu
Assistant Examiner—William K. Cheung
(74) Attorney, Agent, or Firm—Maria Parrish Tungol

(57) ABSTRACT

The present invention related to thermoplastic compositions comprising (A) thermoplastic polycarbonate; (B) a graft polymerisation product of (B-1) a mixture of
  (B-1.1) styrene, α-methylstyrene, halogen or methyl ring-substituted styrene, $C_1$–$C_8$ alkyl methacrylates, or $C_1$–$C_8$ alkyl acrylate and
  (B-1.2) acrylonitrile, methacrylonitrile, $C_1$–$C_8$ alkyl methacrylates, $C_1$–$C_8$ alkyl acrylate, maleic anhydride, $C_1$–$C_4$ alkyl or phenyl N-substituted maleimides grafted on (B-2) a polymer with a glass transition temperature of below −10° C.

(C) vinyl copolymer prepared from
  (C-1) styrene, α-methylstyrene, ring-substituted styrenes, $C_1$–$C_8$ alkyl methacrylates, or $C_1$–$C_8$ alkyl acrylate and
  (C-2) acrylonitrile, methacrylonitrile, $C_1$–$C_8$ alkyl methacrylates, $C_1$–$C_8$ alkyl acrylates, maleic anhydride, or phenyl N-substituted maleimides, (D) a mixture of
  (D-1) phosphagen compound having formula (I—I)

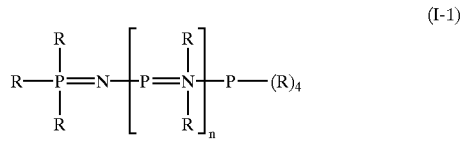

(I-1)

and/or phosphagen compound having formula (I-2)

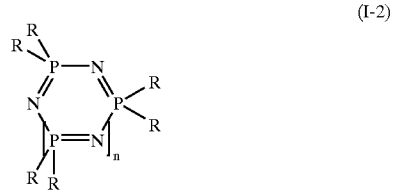

(I-2)

(D-2) phosphate ester and (E) fluorinated polyolefin

21 Claims, No Drawings

FLAME RETARDANT THERMOPLASTIC RESIN COMPOSITION

BACKGROUND OF THE INVENTION

The present invention relates to flame retardant polycarbonate-based thermoplastic resin composition with improved flame retardency, mechanical properties non-juicing property and good appearance, that is useful for the electric and electronic products housings. More particularly, the present invention relates to a polycarbonate-based thermoplastic resin composition which comprises a polycarbonate, a rubber modified styrene graft copolymer, a vinyl copolymer, phosphagen, phosphate compounds and a fluorinated polyolefin.

Description of the Prior Art

Polycarbonate molding compositions are widely used for the parts of electrical products and automotive components as having excellent transparency, high impact strength, and flame retardant properties. However, having poor processability during molding process, polycarbonate resins are usually used by blending with other kinds of resins. For example, molding compositions comprising a polycarbonate resin and a styrene-containing copolymer have good processability as well as high-notched impact strength.

Furthermore, the polycarbonate molding compositions used for parts of home appliances and computers should have particularly high flame resistance as well as the mechanical properties. For this purpose, halogen and/or antimony containing compounds have been used to render flame retardant property- to thermoplastic molding compositions. In U.S. Pat. Nos. 4,983,658 and 4,883,835, a halogen-containing compound is disclosed as a flame retardant. The halogen-containing compound, however, is fatally harmful due to the toxic gases generated during combustion, and therefore nowadays the halogen-free resin compositions are used widely.

As to a common composition without the halogen compound to render the flame resistance, it illustrates the composition using the phosphate typically. For example, U.S. Pat. No. 4,692,488 discloses fire retardant composition comprising a halogen-free aromatic polycarbonate resin, a halogen-free copolymer of styrene and acrylonitrile, a halogen-free phosphorus compound, tetrafluoroethylene polymers and a small amount of ABS graft polymer. The use of a phosphorus compound and perfluroalkane polymer to render flame retardency to a polycarbonate/ABS resin composition, as disclosed in U.S. Pat. No. 4,692,488, prevents the dripping of flaming particles during combustion. While these molding compositions indeed have adequate flame retardant behavior and mechanical properties, unsatisfactory surface crack due to the migration of flame retardant during a molding process, called "juicing", might occur.

U.S. Pat. No. 5,030,675 describes flame retardant, thermoplastic molding composition prepared from an aromatic polycarbonate, ABS polymer, polyalkylene terephthalate together with monophosphates and fluorinated polyolefins as flame retardants. Good stress cracking resistance is accompanied by deficiencies in notched impact strength, together with unsatisfactory heat resistance when exposed to elevated temperatures during processing.

Oligomeric phosphates are also known as flame retardants. Japanese Pat. Laid Open Publication 59-202,240 describes that such compounds can be used as flame retardants in polyamide or polycarbonate. However, this publication contains no indication of any improvement in stress cracking resistance by adding the oligomeric phosphate to polycarbonate molding compound.

U.S. Pat. No. 5,204,394 describes a polymer mixture comprising an aromatic polycarbonate, a copolymer and/or graft copolymer containing styrene, together with polyphosphates as flame retardants. Such a mixture has a poor compatibility between phosphate ester oligomer and polycarbonate, which leads to reduction of the weld-line strength.

U.S. Pat. No. 5,061,745 describes a polycarbonate molding compounds consisting of an aromatic polycarbonate, ABS graft copolymer, monophosphates as flame retardants. In processes using polyphosphates, the occurrence of juicing phenomenon occurs during molding process because the triarylphosphate form the laminate on the surface due to the volatility, and also the heat resistance of compound is lowered by thermal decomposition of oligomeric phosphate, which leads the injection molded articles to have black stripes on the surface.

U.S. Pat. No. 5,672,645 describes flame retardant polycarbonate/ABS molding composition containing an aromatic polycarbonate, a vinyl copolymer, a graft copolymer, a combination of a monophosphate ester and an oligomeric phosphate ester as flame retardants, and a fluorinated polyolefin. In this patent, resorcinol or hydroquinone derivatives were used as an oligomeric phosphate esters, but it is known that the compatibility of resorcinol or hydroquinone type oligomeric phosphorus flame retardant with polycarbonate resin is not so good that the impact strength of these composition can be lowered and surface crack due to the migration of flame retardant to the surface of molded parts still occurs. And also black stripes on the surface of molded parts occur by the thermal decomposition of these resorcinol or hydroquinone derived polyphosphate.

Japanese Pat. Laid Open Publication Hei-6-100785 discloses incorporation of silicone resin or phosphagen to the flame retardant resin composition consisting of thermoplastic resin and phosphorus type compound or red phosphorus to prevent dripping of flaming particles during combustion. However, this publication contains no indication of any improvement in flame retardency as well as weld-line strength and other property by adding phosphagen.

EP 728811 discloses flame retardant resin composition consisting of an aromatic polycarbonate, a vinyl copolymer, a graft copolymer, and an oligomeric phosphagen. This composition using oligomeric phosphagen as a flame retardant imparts non-dripping of flaming particles during combustion without any special anti-dripping agent, and also imparts the good heat resistance and impact strength. However, fluidity of the composition is lowered due to addition of oligomeric phosphagen, which leads to poor processability, and causes black stripes on the surface of injection molded articles. Furthermore, the weld-line strength of this composition is lowered, since compatibility of polycarbonate with oligomeric phosphagen is poor.

In view of the foregoing circumstances, the inventors of the present invention have formulated various thermoplastic resin compositions and carried out extensive studies on their heat resistance, flame retardency, impact strength, processability, and appearance, and found that a resin composition comprising polycarbonate resin, rubber modified styrene graft copolymer, vinyl copolymer, phosphagen compound, phosphate ester and fluorinated polyolefins has a well-balanced physical properties such as improved heat resistance, flame retardency, impact strength, heat resistance, processability, and good appearance, without causing the juicing phenomenon, leading to completion of the present invention.

SUMMARY OF THE INVENTION

An object of the invention is to provide a flame retardant thermoplastic resin composition with good combination of flame retardency, mechanical physical property strength including weld-line strength, good processability, stress crack resistance and heat resistance, which comprise a polycarbonate, a rubber modified styrene graft copolymer, vinyl copolymer, phosphagen compound, phosphate ester and fluorinated polyolefin.

Another object of the invention is to provide a flame retardant thermoplastic resin composition with the balanced properties such as impact strength, heat resistance, good processability, appearance, etc.

The present invention provides flame retardant thermoplastic molding composition comprises (A) 45 to 99 parts by weight of a thermoplastic polycarbonate;

(B) 1 to 50 parts by weight of a graft polymer prepared by graft polymerizing (B-1) 5 to 95 parts by weight of a mixture of (B-1.1) 50 to 95 parts by weight of styrene, α-methylstyrene, halogen or methyl ring-substituted styrene, $C_1$–$C_8$ alkyl methacrylates, $C_1$–$C_8$ alkyl acrylate or a mixture thereof and (B-1.2) 5 to 50 parts by weight of acrylonitrile, methacrylonitrile, $C_1$–$C_8$ alkyl methacrylates, $C_1$–$C_8$ alkyl acrylate, maleic anhydride, Cl-$C_4$ alkyl or phenyl N-substituted maleimides or a mixture thereof, onto (B-2) 5 to 95 parts by weight of a polymer with a glass transition temperature of below —10° C. and selected from a group consisting of butadiene rubbers, acryl rubbers, ethylene/propylene rubbers, styrene/butadiene rubbers, acrylonitrile/butadiene rubbers, isoprene rubbers, EPDM rubbers, polyorganosiloxane/polyalkyl (meth)acrylate rubber composite, and mixture thereof (C) 0.5 to 50 parts by weight of a vinyl copolymer or mixture thereof prepared from (C-1) 50 to 95 parts by weight of styrene, α-methylstyrene, ring-substituted styrenes, $C_1$–$C_8$ alkyl methacrylates, $C_1$–$C_8$ alkyl acrylate or a mixture thereof and (C-2) 50 to 5 parts by weight of acrylonitrile, methacrylonitrile, $C_1$–$C_8$ alkyl methacrylates, $C_1$–C8 alkyl acrylates, maleic anhydride, phenyl N-substituted maleimides or a mixture thereof, (D) 0.5 to 30 parts by weight of the mixture of the organic phosphorus compound based on 100 parts by weight (A)+(B)+(C) of (D—1) 5 to 95 parts by weight of linear phosphagen compound represented by the following formula (I-1) and/or cyclic phosphagen compound represented by the following formula (I-2)

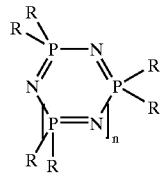
(I-1)

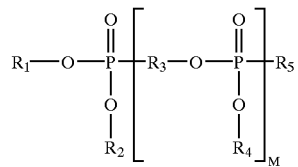
(I-2)

wherein, R represents alkyl, aryl, alkyl substituted aryl, alkoxy, aryloxy, amino or hydroxyl group, and n is 0 or an integer of 1 to 10. (D-2) 95 to 5 parts by weight of phosphate ester represented by the following formula (11) or the mixture thereof with 0.1 to 3 of M value

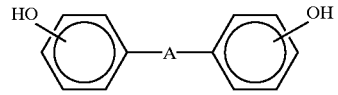
(II)

wherein, $R_1$, $R_2$, R4, and $R_5$ independently of one another are $C_6$-$C_{20}$ aryl or alkyl substituted $C_6$–$C_{20}$ aryl, $R_3$ is alkylene, arylene, or arylene having alkyl group, M is 0 or 1 to 3.

(E) 0. 05 to 5 parts by weight, based on 100 parts by weight of (A)+(B)+(C), of fluorinated polyolefin resin with an average particle size of 0.05 to 1000 μm and density of 2.0 to 2.3 g/cm³.

DEESCRIPTION OF THE PREFERRED EMBODIMENTS (A) Thermoplastic Polycarbonate

Suitable component (A) thermoplastic, aromatic polycarbonates to be used in the invention are generally prepared by reacting diphenols represented by the following formula (III) with phosgene, a halogen formate or a carbonic diester,

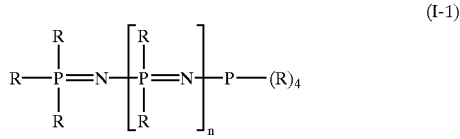
(III)

wherein, A represents a single bond, $C_1$–$C_5$ alkylene, $C_2$-$C_6$ alkylidene, $C5$–$C_6$ cycloalkylidene group, —S— or —$SO_2$—.

Specific examples of diphenols of the formula (II) include hydroquinone, resorcinol, 4,4'-dihydroxydiphenyl, 2,2-bis-(4-hydroxyphenyl) propane, 2,4-bis-(4-hydroxyphenyl)-2-methyl-butane, 1,1-bis-(4-hydroxyphenyl)-cyclohexane, 2,2-bis-(3-chloro-4-hydroxyphenyl) propane, 2,2-bis-(3,5-dibromo-4-hydroxyphenyl)propane. Among them, 2,2-bis-(4-hydroxyphenyl)propane, 2,2-bis-(3,5-dichloro-4-hydroxyphenyl)propane and 1, I-bis-(4-hydroxyphenyl)-cyclohexane are preferred. The most preferred and widely used aromatic polycarbonates are prepared from bisphenol-A, and 2,2-bis-(4-hydroxyphenyl)propane.

As the suitable polycarbonates (A) to be incorporated into the present invention, it is ones having average molecular weights, Mw, of 10,000 to 200,000, preferably of 15,000 to 80,000.

Suitable polycarbonates (A) incorporated into the composition of the invention may be branched in a known manner, in particular preferably by incorporation 0.05 to 2 mol %, based to total quantity of diphenols used, of tri- or higher functional compounds, for example, those with three or more phenolic groups.

Both homopolycarbonates and copolycarbonates are illustrated as suitable polycarbonates for the present invention. Component A may also be a blend of the thermoplastic polycarbonates specified above.

The polycarbonates (A) may be partially or entirely replaced with aromatic polyester-carbonates which are obtained by performing the polymerization reaction in the presence of an ester precursor, for example, a difunctional carboxylic acid.

(B) Graft Copolymer

The graft copolymers to be used in the present invention are those prepared from the following monomer units (B-1) 5 to 95 parts by weight, based on (B), of a mixture of (B-1.1) 50 to 95 parts by weight of styrene, a-methylstyrene, halogen or methyl ring-substituted styrene, $C_1$–$C_8$ alkyl methacrylate, $C_1$–$C_8$ alkyl acrylate, or a mixture thereof, and (B-1.2) 5 to 50 parts by weight of acrylonitrile, methacrylonitrile, $C_1$–$C_8$ alkyl methacrylates, C1–$C_8$ alkyl acrylate, maleic anhydride, $C_1$–C8 alkyl or phenyl N-substituted maleimides or a mixture thereof onto (B-2) 5 to 95 parts by weight of a polymer with a glass transition temperature of below –10° C. and selected from a group consisting of butadiene rubbers, acryl rubbers, ethylene/propylene rubbers, styrene/butadiene rubbers, acrylonitrile/butadiene rubbers, isoprene rubbers, EPDM rubbers, polyorganosiloxane/polyalkyl (meth)acrylate rubber composite, and a mixture thereof.

The above $C_1$–$C_8$ alkyl acrylates or $C_1$–$C_8$ alkyl methacrylates are the esters of acrylic or methacrylic acids respectively with monohydric alcohols having 1 to 8 carbon atoms. Specific examples include methyl methacrylate, ethyl methacrylate and propyl methacrylate. Among methyl methacrylate, methacrylic acid ester is particularly preferred.

Preferred examples of the graft polymers (B) include polybutadienes, butadiene/styrene copolymers and acryl rubbers grafted with styrene and/or acrylonitrile and/or (meth)acrylic acid alkyl esters. Of these, ABS graft polymers are particularly preferred for the polymers (B).

The preferred average particle size of the rubber(B.2) is 0.05 to 4 μm in order to improve the impact strength and surface of the moldings.

The graft copolymers of components (B) may be prepared according to the conventional methods in the art of preparation of the graft copolymers, in particular, emulsion, suspension, solution or bulk polymerization. Preferred method for preparing the graft copolymer (B) is emulsion or bulk polymerization.

(C) Vinyl Copolymer

Component (C) vinyl copolymers to be used in the present invention are those prepared from (C-1) 50 to 95 parts by weight of styrene, α-methylstyrene, ring-substituted styrenes, $C_1$–$C_8$ alkyl methacrylates, $C_1$–$C_8$ alkyl acrylates or a mixture thereof, and (C-2) 50 to 5 parts by weight of acrylonitrile, methacrylonitrile, $C_1$–$C_8$ alkyl methacrylates, $C_1$–$C_8$ alkyl acrylates, maleic anhydride, N-substituted maleimides or a mixture thereof The said $C_1$–$C_8$ alkyl acrylates or $C_1$–$C_8$ alkyl methacrylates are the esters of acrylic or methacrylic acids respectively with monohydric alcohols having 1 to 8 carbon atoms. Specific examples include methyl methacrylate, ethyl methacrylate and propyl methacrylate. Among them, methyl methacrylate is particularly preferred.

The copolymers of component (C) may be often produced as secondary products in the graft polymerization during production of component (B), particularly when a large quantity of monomers is grafted onto a small quantity of rubber. The quantity of copolymer (C) to be used in accordance with the present invention does not include these secondary graft polymerization product.

The component (C) copolymers are resinous thermoplastic material, and they do not contain rubber.

Preferred copolymers (C) are those prepared from methyl methacrylate with methyl (meth)acrylate, which may be produced by free-radical polymerization, in particular by emulsion, suspension, solution or bulk polymerization.

Preferred copolymers (C) are those prepared from styrene with acrylonitrile and optionally methyl methacrylate, from a-methylstyrene with acrylonitrile and optionally methyl methacrylate or from styrene and a-methylstyrene with acrylonitrile and optionally methyl methacrylate.

The component (C) styrene/acrylonitrile copolymers are materials known per se and may be prepared, for examples, by free-radical polymerization, in particular by emulsion, suspension, solution or bulk polymerization. The preferable component (C) copolymers is illustrated as those having weight average molecular Mw of between 15,000 and 200,000.

Another Preferred copolymers (C) to be incorporated into the composition of the invention are also random copolymers of styrene and maleic anhydride, which may be produced from the corresponding monomers by continuous bulk or solution polymerization with incomplete conversion. The proportions of the two components in the suitable random styrene-maleic anhydride copolymers may be varied within a wide range. The preferred maleic anhydride content is between 5 and 25 wt. %. The molecular weights (number average, Mn) of the suitable component (C) random tyrene-maleic anhydride copolymers may vary over a wide range. A range of 60,000 to 200,000 is preferred. An intrinsic viscosity of 0.3 to 0.9 is preferred for these products.

Instead of styrene, the vinyl copolymers (C) may also contain ring-substituted styrenes such as p-methylstyrene, vinyltoluene, 2,4-dimethylstyrene, and other substituted styrenes such as a -methylstyrene.

The vinyl copolymers mentioned in the above can be used alone or in admixture with other two or more vinyl copolymers.

(D-1) Phosphagen

Phosphagen used in the present invention is the linear phosphagen represented by the following formula(I- I) and/or the cyclic phosphagen represented by the following formula(I-2)

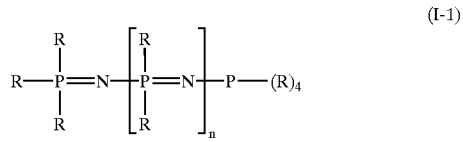

(I-1)

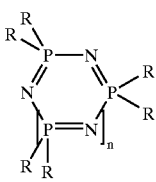
(I-2)

wherein, R represents alkyl, aryl, alkyl substituted aryl, alkoxy, aryloxy, amino or hydroxyl group, and n is 0 or an integer of 1 to 10. The said alkoxy or aryloxy group may be substituted with alkyl, aryl, amino or hydroxyl group.

The examples of phosphagen include propoxy phosphagen, phenoxy phosphagen, methylphenoxyphosphagen, aminophosphagen, fluoroalkyl phosphagen, etc. and of these, phenoxyphosphagen is preferred. The phosphagen compound can be used alone or in admixture with 2 kinds or more thereof. The substituent R may be different each other, and the said compound having two or more different functional groups can be used. Such phosphagen can be obtained from substituting a part of the functional group with phenoxy group, and then substituting with other kinds of functional group continuously, for example, phenoxypropoxyphosphagen. Phosphagen is generally prepared by reacting chlorophosphagen with alcohol phenol, etc.

The phosphagen (D-1) content in the present invention is 5 to 95% by weight based on 100 part by weight of the (D), preferably 10 to 90% by weight. When incorporating it more than 95% by weight, the fluidity, weld-line strength, retardency, etc. of the flame retardant resin composition is decreased, which leads the injection molded articles to have black stripes or stains. And when incorporating it less than 5% by weight, the heat resistance, retardency, and the impact strength are decreased, which leads to juicing phenomenon during molding processes.

(D-2) Phosphate ester

The phosphate compound used in the present invention is a compound represented by the following formula (II) or the mixture thereof

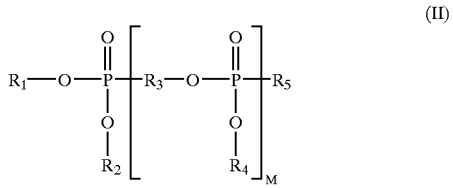
(II)

wherein, $R_1$, $R_2$, R4, and $R_5$ are the same or different from each other and each independently represents $C_6$–$C_{20}$ aryl or alkyl substituted $C_6$–$C_{20}$ aryl, $R_3$ is $C_6$–$C_{30}$ aryl or alkyl substituted $C_6$–$C_{30}$ aryl derivatives, and M value represents a number of 0, 1, 2 or 3 when the said phosphate ester is used alone, and the average value of M is 0.1 to 3 when the said phosphate ester is used in a mixture thereof.

Specific examples of $R_1$, $R_2$, R4, and $R_5$ include a phenyl group or a phenyl group which is substituted by an alkyl group such as tert-butyl, isopropyl, isobutyl, isoamyl, tert-amyl, etc.

The preferred $C_6$–$C_{30}$ aryl or alkyl substituted $C_6$–$C_{30}$ aryl group for $R_3$ includes resorcinol, hydroquinone, and bisphenol-A. That is to say, the retardant component (D) is an aryl derived oligomeric phosphate whose M value is 0.8 to 1.2. In the present invention, the mixture of phosphate includes a mixture of 0 to 40 % by weight of the phosphate having M value of 0, 70 to 100% by weight of that having of M value of 1, and 0 to 20% by weight of that having of M value of 2 or more, and among them, it is preferable to incorporate the mixture of 80% by weight or more of the phosphate having M value of 1 to the component (D).

As a flame retardant in the present invention, the mixture of the phosphagen (D-1) and phosphate ester (D-2) can be used and the ratio thereof varies in a broad range. Preferred examples include 20 to 80% by weight of (D-1) and 80 to 20% by weight of (D-2), more preferably 30 to 70% by weight of (D-1) and 70 to 30% by weight of (D-2). The retardant may contain preferably 0.5 to 30 parts by weight of the mixture of the organic phosphorus compound based on 100 parts by weight of the sum of (A), (B) and (C) of the present composition.

(F) Fluorinated polyolefins

Examples of fluorinated polyolefins used in the present invention include polytetrafluoroethylene, polyvinylidene fluoride, tetrafluoroethylene/vinylidene fluoride copolymer, tetrafluoroethylene/hexafluoropropylene copolymer and ethylene/tetrafluoroethylene copolymers. The said fluorinated polyolefins may be used alone or in admixture with other two or more fluorinated polyolefins.

The fluorinated polyolefin decreases the melt flow of the flameproof thermoplastic resin during combustion by forming a fibrillar network in the resin and increases shrinkage of the resin, thereby preventing dripping of the melted resin during combustion.

These fluorinated polymers may be produced using known processes, for example, by polymerization of tetrafluoroethylene in an aqueous medium with a free radical forming catalyst, for example sodium, potassium or ammonium peroxydisulphate at pressures of 7 to 71 kgf/cm$^2$ and at temperatures of 0° C. to 200° C., preferably at temperatures of 20° C. to 100° C.

The fluorinated polyolefins may be used in powder form or in emulsion form. Fluorinated polyolefins of emulsion state show a good dispersion, but make the preparation process complicated. Therefore, it is desirable to use powder state fluorinated polyolefins that can be dispersed evenly in the total resins to form a fibrillar network.

The fluorinated polyolefins suitable for the present invention is tetrafluoroethylene polymers with average particle sizes of 0.05 to 1000 μm and densities of 2.0 g/cm$^3$ to 2.3 g/cm$^3$.

The amount of the fluorinated polyolefins to be blended in the composition is 0.05 to 5.0 part by weight, based on 100 parts by weight of the basic resin (A)+(B)+(C).

In addition to the above-mentioned components, the thermoplastic molding composition according to the invention may further contain the conventional additives such as lubricants and mold release agents, nucleating agents, antistatic agents, stabilizers, fillers and reinforcing materials, together with dyes and pigments. The amount of fillers or reinforced molding compounds to be incorporated may contain up to 60 parts, preferably 10 to 40 parts by weight based on 100 parts by weight of the basic resin (A)+(B)+(C).

The thermoplastic resin compositions can be prepared according to the conventional techniques of preparation of resin compositions, for example, by mixing together the constituents including the various additives and melt-extruding with the extruders in pellet form.

The molding composition according to the present invention may be used to produce moldings of any kind. The molding composition is particularly suitable for the production of electric and electronic products housings, for example, computer housings, which are required to exhibit particularly high-notched impact strength and stress cracking resistance.

EXAMPLES

The present invention may be better understood by reference to the following examples that are intended for the purpose of illustration and are not to be construed as in any way limiting the scope of the present invention, which is defined in the claims appended hereto.

(A) Polycarbonate

Bisphenol A based polycarbonate with a melt flow index of 20 g/10 min. at 250° C., under 10 kg, in accordance with ASTM D 1238 was used.

(B) Rubber Modified Graft Copolymer 45 parts by weight of polybutadiene latex, 36 parts by weight of styrene, 14 parts by weight of acrylonitrile, and 150 parts by weight of deionized water were mixed, and 1.0 parts by weight of potassium oleate, 0.4 parts by weight of cumene hydroperoxide, and 0.3 parts by weight of mercaptan-based chain transfer agent were added to the mixed solution. The resulting solution was maintained at 75° C for 5 hours to prepare a ABS graft copolymer latex. To the resulting graft copolymer, 1% sulfuric acid solution was added to prepare graft copolymer in powder form.

(C) Vinyl Copolymer

To a mixture of 70 parts by weight of styrene, 30 parts by weight of acrylonitrile and 120 parts by weight of deionized water, 0.2 parts by weight of azobisisobutyronitrile and 0.5 parts by weight of tricalcium phosphate were added. SAN copolymer was prepared by suspension polymerization, and subsequently by washing, dehydrating and drying the resultant product. SAN copolymer in powder form was obtained.

(D-1) Phosphagen

Phosphagen used in the present invention is the mixture of the cyclic phosphagens represented by the formula(I-2), wherein R represents phenoxy group and n represents 1 and 2.

(D-2) Phosphate ester

Resorcinol bis(diphenylphosphate) with an average n value of 1.2 was used.

(D-3) Triphenylphosphate.

(E) Fluorinated Polyolefin

Teflon(trademark) 7AJ of Dupont, Inc. of U.S.A. was used.

Examples 1 to 3 and Comparative Examples 1 and 2

The thermoplastic resin compositions of Example 1 to 3 and comparative example 1 and 2 were prepared from the above-mentioned constituents in the amount as shown in the following Table 1 and the properties of the compositions were also shown in Table 1.

All the components were mixed with an antioxidant and thermal stabilizer, and extruded in a twin-screw extruder(L/D=35, Φ=45). The resulting extrudates were pelletized and the test specimens for mechanical properties were produced using an 10 oz injection molding machine at the temperature of 250° C. The specimens were left at 23° C., under the relative humidity of 50% for 48 hours and then were tested in accordance with ASTM.

The Izod impact strength was tested according to ASTM D256, using the V-notch sample with thickness of 3.2 mm. The weld-line strength was tested, using the sample with thickness of 3.2 mm and gates at the both sides.

Heat distortion temperature was tested under 18.6 kgf according to ASTM D648.

Flame retardancy was tested according to UL94, using the sample having thickness of 1.2 mm. The total combustion time is the sum of the first and the second combustion when 5 samples were tested.

Melt flow index was tested under the condition of 250° C. and load of 10 kg, in accordance with ASTM D1238. Thermal stability was measured by the occurrence of black streak on the surface of molded parts of dimensions 200 mm×50 mm×2 mm after molding. The injection molding temperature was varied from 260 to 300° C. and the injection pressure and speed were also varied.

TABLE 1

|  | Example | | | Comparative Example | |
|---|---|---|---|---|---|
|  | 1 | 2 | 3 | 1 | 2 |
| (A) Polycarbonate | 75 | 75 | 75 | 75 | 75 |
| (B) Graft copolymer | 15 | 15 | 15 | 15 | 15 |
| (C) Vinyl copolymer | 10 | 10 | 10 | 10 | 10 |
| (D-1) Phosphagen | 9 | 6 | 10 | 15 | — |
| (D-2) Phosphate ester | 6 | 9 | — | — | 15 |
| (D-3) Triphenyl phosphate | — | — | 5 | — | — |
| (E) PTFE | 0.2 | 0.2 | 0.2 | 0.2 | 0.2 |
| Izod Impact Strength[(2)] (1/8", kg · cm/cm) | 53 | 52 | 54 | 51 | 47 |
| Weld-line strength (kg f m/cm) | 15 | 17 | 16 | 12 | 14 |
| Heat distortion temperature (° C.) | 83 | 82 | 82 | 83 | 81 |
| UL94 (1/16") | V-0 | V-0 | V-0 | V-1 | V-1 |
| Maximum combustion time (sec) | 37 | 36 | 32 | 52 | 57 |
| Melt flow index (g/10 min.) | 47 | 56 | 54 | 40 | 61 |
| Juicing* | ○ | ○ | ○ | ○ | X |
| Heat resistance (black streak)** | ○ | ○ | ○ | X | Δ |

Notes:

*:
○: Juicing was not observed.
X: Juicing was occurred.

**:
○: Black streak was not observed.
Δ: Black streak was observed sometimes depending on injection molding condition.
X: Black streak was observed often.

It may be seen from Table 1 that when the mixture of phosphagen and phosphate ester and a mixture of phosphagen and triphenyl phosphate as a retardant were incorporated into the composition, all specimens in the examples showed excellent properties in heat resistance, weld-line strength, and izod impact strength, and also the thermoplastic composition does not show the juicing and black streak. Contrary to the samples of the examples, the samples of the comparative examples shows lower weld-line strength and also the black streaks appeared.

As shown above, the thermoplastic composition of the present invention shows excellent properties, and therefore it is useful for the electric and electronic products housings.

What is claimed is:

1. Flame retardant, thermoplastic molding composition which comprises (A) 45 to 99 parts by weight of a thermoplastic polycarbonate;

(B) 1 to 50 parts by weight of a graft polymer prepared by graft polymerizing (B-1) 5 to 95 parts by weight of a mixture of (B-1.1) 50 to 95 parts by weight of styrene, α-methylstyrene, halogen or methyl ring-substituted styrene, $C_1$–$C_8$ alkyl acrylate or a mixture thereof, and (B-1.2) 5 to 50 parts by weight of acrylonitrile, methacrylonitrile, $C_1$–$C_8$ alkyl methacrylates, $C_1$–$C_8$ alkyl acrylate, maleic anhydride, $C_1$–$C_4$ alkyl or phenyl N-substituted maleimides or a mixture thereof, onto (B-2) 5 to 95 parts by weight of polymer with a glass transition temperature of below −10° C. and selected from a group consisting of butadiene rubbers, acryl rubbers, ethylene/propylene rubbers, styrene/butadiene rubbers, acrylonitrile/butadiene rubbers, isoprene rubbers, EPDM rubbers, polyorganosiloxane/polyalkyl (meth)acrylate rubber composite, and mixture thereof (C) 0.5 to 50 parts by weight of a vinyl copolymer or mixture thereof prepared from (C-1) 50 to 95 parts by weight of styrene, α-methylstyrene, ring-substituted styrenes, $C_1$–$C_8$ alkyl methacrylates, $C_1$–$C_8$ alkyl acrylate or a mixture thereof and (C-2) 50 to 5 parts by weight of acrylonitrile, methacrylonitrile, $C_1$–$C_8$ alkyl methacrylates, $C_1$–$C_8$ alkyl acetates, maleic anhydride, phenyl N-substituted maleimides or a mixture thereof, (D) 0.5 to 30 parts by weight based on 100 parts by weight (A)+(B)+(C) of a mixture of (D-1) 5 to 95 parts by weight of linear phosphagen compound represented by the following formula (I-I) and/or cyclic phosphagen compound represented by the following formula (I-2)

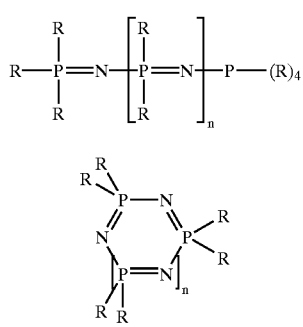

wherein, R represents alkyl, aryl, alkyl, substituted aryl, alkoxy, aryloxy, amino or hydroxyl group, and n is 0 or an integer of 1 to 10 and (D-2) 95 to 5 parts by weight of phosphate ester represented by the following formula (II) or a mixture thereof

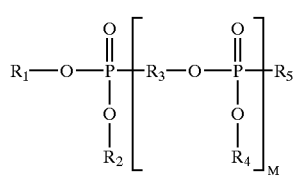

wherein, $R_1$, $R_2$, $R_4$ and $R_5$ independently of one another are $C_6$–$C_{20}$ aryl or alkyl substituted $C_6$–$C_{20}$ aryl, $R_3$ is alkylene, arylene, or arylene having alkyl group, M is 0 or 1 to 3 when the phosphate ester (D-2) is used alone and M is an average value from 0.1 to 3 when a mixture of phosphate esters (D-2) is used, and (E) 0.05 to 5 parts by weight, based on 100 parts by weight of (A)+(B)+(C), of fluorinated polyolefin resin with an average particle size of 0.05 to 1000 μm and density of 2.0 to 2.3 g/cm³.

2. Flame retardant thermoplastic molding composition according to claim 1, wherein the weight ratio of the component (D-1) to (D-2) is between 30:70 to 90:10.

3. Flame retardant thermoplastic molding composition according to claim 1, wherein said component (D-1) is phenoxy phosphagen.

4. Flame retardant thermoplastic molding composition according to claim 1, wherein said component (D-2) is phosphate ester derived from resorcinol, hydroquinone, and/or bisphenol-A.

5. Flame retardant thermoplastic molding composition according to claim 1, wherein $R_1$, $R_2$, $R_4$, and $R_5$ of component (D-2) is independently phenyl, or phenyl group substituted with methyl or hydroxy.

6. Flame retardant thermoplastic molding composition according to claim 1, wherein said resin composition further includes at least one additives selected from the group consisting of inorganic fillers glass fibers, carbon fibers, thermal stabilizers, antioxidants, light stabilizers, plasticizers, dyes, pigments, lubricants, mold release agents, fillers, nucleating agents and antistatic agents.

7. Flame retardant thermoplastic molding composition according to claim 1, wherein said component (D) is incorporated in an amount of 10 to 25 parts by weight, based on 100 parts by weight of (A)+(B)+(C).

8. Flame retardant thermoplastic molding composition according to claim 1 wherein component (B) is an ABS graft polymer.

9. Flame retardant thermoplastic molding composition according to claim 1 wherein component (C) is a copolymer of styrene, acrylonitrile, and optionally methyl methacrylate, a copolymer of α-methylstyrene, acrylonitrile, and optionally methyl methacrylate, or a copolymer of styrene, α-methylstyrene, acrylonitrile, and optionally methyl methacrylate.

10. Flame retardant thermoplastic molding composition according to claim 1 wherein (D-1) is propoxy phosphagen, phenoxy phosphagen, methylphenoxyphosphagen, aminophosphagen, or fluoroalkyl phosphagen or a mixture thereof.

11. Flame retardant thermoplastic molding composition according to claim 1 wherein (D-2) is an oligomeric phosphate ester whose M value is 0.8 to 1.2.

12. Flame retardant thermoplastic molding composition according to claim 1 wherein (D-2) is a mixture of phosphate esters of formula (II) comprising 0 to 40% by weight of phosphate ester whose M value is 0, 70 to 100% by weight of phosphate ester whose M value is 1, and 0 to 20% of phosphate ester whose M value is 2 or more.

13. Flame retardant thermoplastic molding composition according to claim 1 wherein (D-2) is a mixture of phosphate esters of formula (II) comprising 80 to 100% by weight of phosphate ester whose M value is 1.

14. Flame retardant thermoplastic molding composition according to claim 1 wherein the composition comprises 20 to 80% by weight of (D-1) and 80 to 20% by weight of (D-2).

15. Flame retardant thermoplastic molding composition according to claim 1 wherein the composition comprises 30 to 70% by weight of (D-1) and 70 to 30% by weight of (D-2).

16. Flame retardant, thermoplastic molding composition which comprises:

(A) 45 to 99 parts by weight of a thermoplastic polycarbonate;

(B) 1 to 50 parts by weight of a graft polymer prepared by graft polymerizing (B-1) 5 to 95 parts by weight of a mixture of (B-1.1) 50 to 95 parts by weight of styrene, α-methylstyrene, halogen or methyl ring-substituted styrene, $C_1$–$C_8$ alkyl methacrylates, $C_1$–$C_8$ alkyl acrylate or a mixture thereof, and (B-1.2) 5 to 50 parts by weight of acrylonitrile, methacrylonitrile, $C_1$–$C_8$ alkyl methacrylates, $C_1$–$C_8$ alkyl acrylate, maleic anhydride, $C_1$–$C_4$ alkyl or phenyl N-substituted maleimides or a mixture thereof, onto (B-2) 5 to 95 parts by weight of a polymer with a glass transition temperature of below –10° C. and selected from a group consisting of butadiene rubbers, acryl rubbers, ethylene/propylene rubbers, styrene/butadiene rubbers, acrylonitrile/butadiene rubbers, isoprene rubbers, EPDM rubbers, polyorganosiloxane/polyalkyl(meth)acrylate rubber composite, and mixture thereof (C) 0.5 to 50 parts by weight of a vinyl copolymer or mixture thereof prepared from (C-1) 50 to 95 parts by weight of styrene, α-methylstyrene, ring-substituted styrenes, $C_1$–$C_8$ alkyl methacrylates, $C_1$–$C_8$ alkyl acrylate or a mixture thereof and (C-2) 50 to 5 parts by weight of acrylonitrile, methacrylonitrile, $C_1$–$C_8$ alkyl methacrylates, $C_1$–$C_8$ alkyl acrylates, maleic anhydride, phenyl N-substituted maleimides or a mixture thereof, (D) 0.5 to 30 parts by weight based on 100 parts by weight (A)+(B)+(C) of a mixture of (D-1) 5 to 95 parts by weight of a cyclic phosphagen compound represented by the following formula (I-2)

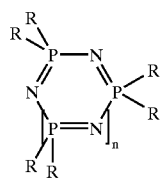

(I-2)

wherein R represents a phenoxy group, wherein n is 1 or 2 and (D-2) 95 to 5 parts by weight of phosphate ester represented by the following formula (II) or a mixture thereof

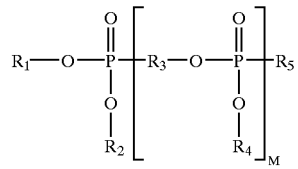

(II)

wherein, $R_1$, $R_2$, $R_4$ and $R_5$ independently of one another are $C_6$–$C_{20}$ aryl or alkyl substituted $C_6$–$C_{20}$ aryl, $R_3$ is alkylene, arylene, or arylene having alkyl group, M is 0 or 1 to 3 when the phosphate ester (D-2) is used alone and M is an average value from 0.1 to 3 when a mixture of phosphate esters (D-2) is used, and (E) 0.05 to 5 parts by weight, based on 100 parts by weight of (A)+(B)+(C), of fluorinated polyolefin resin with an average particle size of 0.05 to 1000 μm and density of 2.0 to 2.3 g/cm³.

17. Flame retardant thermoplastic molding composition according to claim 16 wherein component (B) is an ABS graft polymer.

18. Flame retardant thermoplastic molding composition according to claim 16 wherein component (C) is a copolymer of styrene and acrylonitrile.

19. Flame retardant thermoplastic molding composition according to claim 16 wherein (D-2) is an oligomeric phosphate whose M value is 0.8 to 1.2.

20. Flame retardant thermoplastic molding composition according to claim 16 wherein (D-2) is a mixture of phosphate esters of formula (II) comprising 0 to 40% by weight of phosphate ester whose M value is 0, 70 to 100% by weight of phosphate ester whose M value is 1, and 0 to 20% of phosphate ester whose M value is 2 or more.

21. Flame retardant thermoplastic molding composition according to claim 16 wherein (D-2) is a mixture of phosphate esters of formula (II) comprising 80 to 100% by weight of phosphate ester whose M value is 1.

* * * * *